H. C. MUSTIN.
FOCUSING CAP FOR TELESCOPES.
APPLICATION FILED DEC. 13, 1907.
924,488.
Patented June 8, 1909.
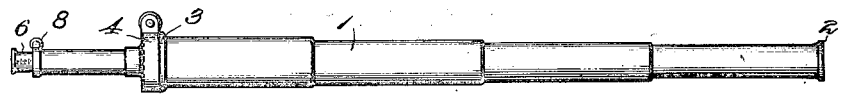
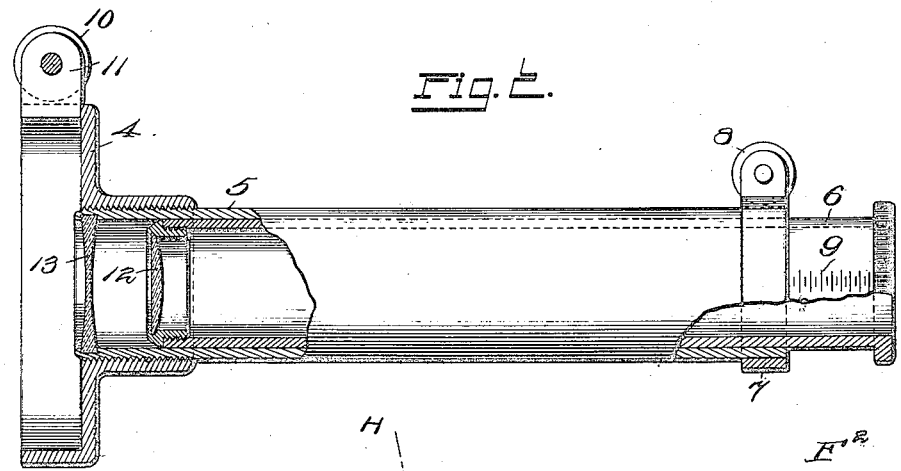
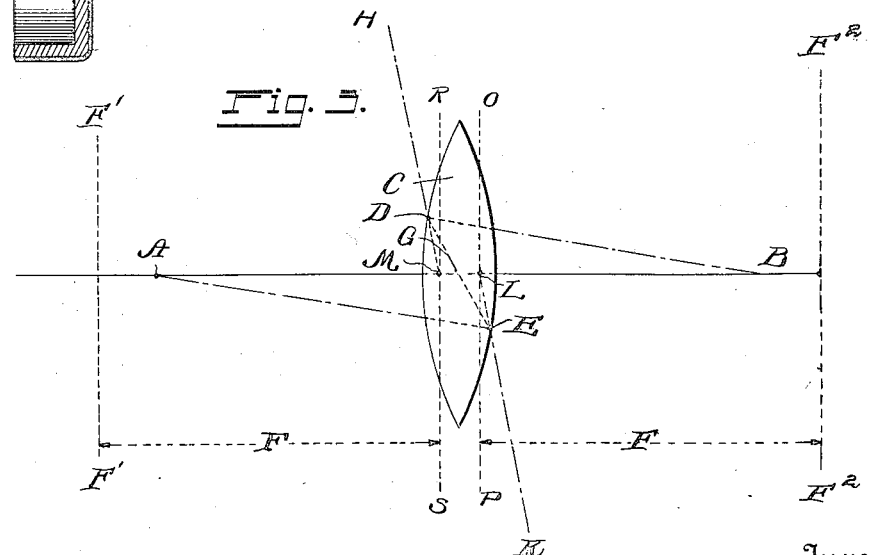

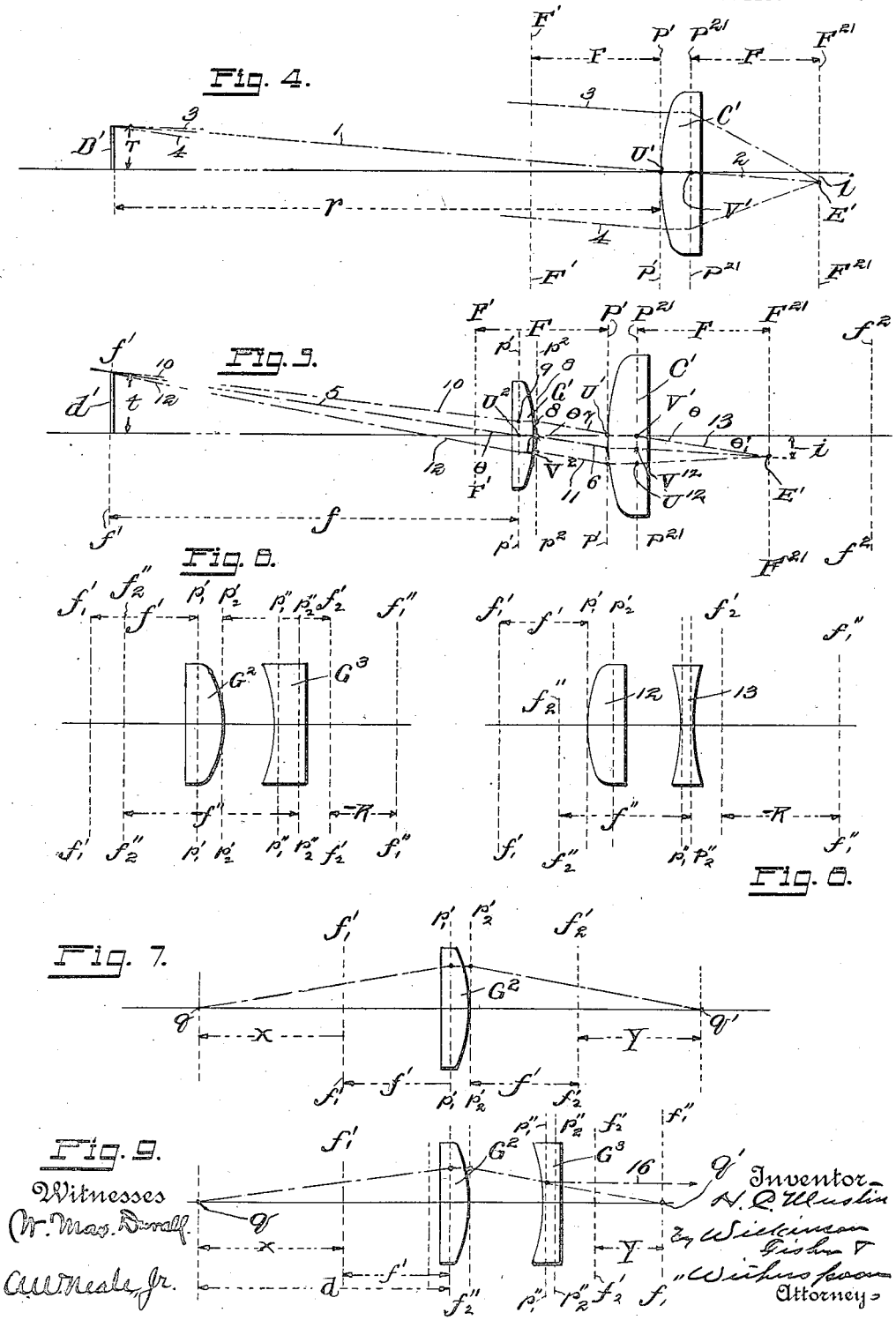

UNITED STATES PATENT OFFICE.

HENRY C. MUSTIN, OF THE UNITED STATES NAVY.

FOCUSING-CAP FOR TELESCOPES.

No. 924,488.　　　　Specification of Letters Patent.　　　Patented June 8, 1909.

Application filed December 13, 1907. Serial No. 406,388.

*To all whom it may concern:*

Be it known that I, HENRY C. MUSTIN, (lieutenant, U. S. Navy,) at present attached to the U. S. S. *Kansas*, League Island Navy-Yard, Philadelphia, Pennsylvania, have invented certain new and useful Improvements in Focusing-Caps for Telescopes; and I do hereby declare the following to be a full, clear, and exact description of the invention, such as will enable others skilled in the art to which it appertains to make and use the same.

My invention relates to focusing caps for sighting telescopes, and the object of my invention is to provide such a cap which will render the images of miniature targets when viewed at short distances, clear and distinct, although the telescope itself is focused for battle or for target practice.

It is well known that the vessels of our navy are equipped with practice apparatus designed to improve the marksmanship of those whose duty it is, or might be, to fire the guns in battle; and that said apparatus comprises a miniature target carried by the ship on what is known as Morris tube booms. But since this miniature target is quite close to the telescope, sometimes not more than thirty inches, it is evident, that in order to clearly see the image of this miniature target in the telescope, it is essential that the same be specially focused. In other words, whenever this practice outfit is to be used on ship board, it is essential that the focus of the sighting telescopes be changed from that suitable for battle or for target practice, to that suitable for this miniature target. This changing of the focus and sights on the guns, is objectionable for many reasons obvious to skilled gunners, and, as above stated it is the object of my invention to render the same unnecessary, and to therefore permit the telescopes to be permanently focused and the sights permanently adjusted for battle, or for target practice.

To these ends my present invention consists in a focusing cap, provided with a pair of lenses, adapted to be secured to the object end of a telescope, and to render the image of the miniature target clear and distinct although the sighting telescope remains focused for battle or for target practice.

Referring to the accompanying drawings forming a part of this specification:—Figure 1, represents a longitudinal view of a sighting telescope provided with one of my focusing caps. Fig. 2, represents an enlarged view of my focusing cap detached partly in section. Fig. 3, a diagrammatic view illustrating the unit and focal planes and unit points, necessary to explain the principles of my invention. Fig. 4, a diagram showing such planes and points in connection with the objective of the telescope. Fig. 5, the same in connection with an objective and a plus lens. Fig. 6, the same in connection with a combination of a plus and a minus lens to be employed in my cap, and Figs. 7, 8 and 9, further diagrams illustrating the principles involved in my invention.

In order that my invention may be clearly understood, it is necessary to briefly outline its optical principles as follows:—As is well known when a telescope is in focus for battle or for target practice, its object glass receives practically parallel pencils of rays of light, and when pointed at an object as near as the end of what is known in the navy as a Morris tube boom, the form of the entering pencils is divergent instead of parallel. Therefore, in this latter case, any image of an object at the end of said boom, instead of lying in the plane of the cross hairs, would lie considerably to the rear and would therefore appear blurred, producing both indistinctness and a large amount of parallax. It is evident that this indistinctness could be corrected by merely placing a plus lens between the end of the Morris tube boom and the telescope, provided the said lens is properly located. And it is further evident that this proper location must be such that its first focal plane will be coincident with the plane of the object viewed on the end of the boom; for by definition divergent pencils proceeding from points in the first focal plane of a plus lens, are after emergence from the lens, changed to the parallel form. But, for many reasons, in practice instead of using a single plus lens to render parallel these entering divergent pencils, it is preferable to use a combination of a plus and a minus lens, which as is well known, and as will fully appear below, is the full optical equivalent of a single plus lens. Such a combination is illustrated in the lenses illustrated in Figs. 8 and 9 of the drawings. But not only in practice, is it necessary to correct these divergent entering rays, but it is also necessary that the image of the miniature target should appear in the telescope precisely as does the image of a real target, both as to form and dimensions; and in order to accomplish this a photograph is taken on glass of two service targets moored as at record target practice and the height of the miniature target is calculated from the formula $$t = \frac{Tf}{r},$$

where $t$ is the height of the miniature target; T the height of the service target, $r$ is the mean or average target range, and $f$, the focal length of the focusing lens. This equation is independent of the magnifying power of the telescope and the distance between the focusing cap lens and telescope, and in order to render clear the operation of my focusing cap it will be necessary to show how the same is derived. But before deriving this equation it will, also, be necessary to make clear the meaning of certain planes and points used in deriving the same.

Referring to Fig. 3, of the drawings, if A and B are the centers of curvature of the surfaces of a double convex lens C, and if B D, and A E, are parallel, then a ray of light H D entering at D, will be refracted along the path D E, cutting A B, at G, and finally emerging along E K, parallel to its original direction, all as is well known. If we now prolong H D, until it cuts A B, at M, and prolong K E, until it cuts A B at L, and then draw the planes O P and R S, through the points L and M, respectively, and perpendicular to A B, the points L and M, will be unit points. That is to say, in the modern treatment of optical problems, the planes O P and R S, are called unit planes, and the points L and M, are called unit points, and it is well known that in considering a lens, or a combination of lenses, only the cardinal planes consisting of the unit planes and the focal planes (which are the planes perpendicular to the axis drawn through the principal foci) of said lenses need be taken into consideration. This will be apparent from an inspection of Fig. 3, which in the line D E shows the actual path of the ray H D through the lens. It is clear that if this line D E had been omitted, and the actual path had been considered as passing from the entering point D to the first unit point M, from the first unit point M to the second unit point L, and from the second unit point L, along the line L E K to its end, precisely the same parallel rays H D and E K before and after emergence would have been obtained. In graphically indicating such a path, it would only be necessary to know the unit planes, the unit points and to simply draw the parallel straight lines H M and L K, all as is well known. Therefore, in Figs. 4, 5, 6, 7, 8 and 9, I will omit the actual paths of the rays through the lenses, and will only indicate graphically the paths of the rays in straight lines to the first unit point, thence in straight lines from the first unit point to the second unit point, and finally in straight lines from the second unit point out of the lens to the end of the path, or focus of said rays.

Now coming back to the question of deriving the formula for expressing the height of the miniature target, and referring especially to Fig. 4, F' F', and $F^{21}$ $F^{21}$, represent the focal planes passing through the principal foci of the telescope objective C'; P' P' and $P^{21}$ $P^{21}$, the unit planes of the same, and F, the focal length of said objective. These unit planes are differently located from those in Fig. 3, owing to the faces of the lens being different. D', represents the service target of a height, T, above the axis of the telescope, and $r$, is the mean target practice range which of course is great in value as compared to the height T. Now in accordance with the well established properties of unit points, a straight line 1 from the upper extremity of the target D' to the first unit point U', of the lens C', represents the entering path of a ray that passes through the objective without deviation; and a parallel straight line 2, drawn through the second unit point V', gives the final path of the ray. This ray is the axis of a pencil, which being parallel before entering the objective C', is convergent after emergence from said objective; and by the well known laws of optics, since the distance $r$ is very great this pencil must come to a focus in the second focal plane $F^{21}$ $F^{21}$. The point E', where the axis of this pencil intersects the second focal plane, is obviously the focus corresponding to the upper extremity of the target D'. The distance of this point below the axis of the telescope gives the height of the inverted image of the target to which I will assign the dimension $i$. The boundary of this pencil is shown by broken lines 3 and 4 in Fig. 4. The actual path of the rays inside the lens is of course direct from the point of incidence to the point of emergence; but in the figure I have used the graphic method, as above stated, for the interior path which is based on the well known fact, that the original and final directions of any ray intercept equal distances on the unit planes. That is to say, the lines 1 and 2 intercept zero distances on the unit planes P' P' and $P^{21}$ $P^{21}$, while the lines 3 and 4 between said planes, are parallel to the axis of the lens and therefore intercept equal distances on said planes.

From the figure by a similarity of triangles $$\frac{i}{F} = \frac{T}{r}$$

Referring to Fig. 5, of the drawings, I have represented the cardinal planes of the objective C', as in Fig. 4, and have also represented the focusing lens G', whose focal lengths is $f$. The unit planes of the lens G', are represented by $p'$ $p'$ and $p^2$ $p^2$, and the focal planes of said lens by $f'f'$ and $f^2f^2$. In this figure $d'$, represents the miniature target whose height above the common axis of the telescope is $t$, and the lens G', is so placed that its focal plane $f'f'$, will coincide with the plane of said target $d'$, as shown. In this figure the graphic path of a ray of light which passes through the lens without deviation is shown by the lines 5 and 6, which pass to the first unit point $U^2$, of the lens G', thence to the second unit point $V^2$, of said lens, and finally from said point $V^2$, in a direction parallel to the first direction. These lines 5 and 6, represent the axis of a pencil that is divergent before entering the lens G', and is parallel after emergence, for the reason that by construction its source lies in the first focal plane $f'f'$, of the lens G', all as is well known. Now if we draw from the first unit point U', of the lens C', in Fig. 5, the line 7, parallel to the line 6, cutting the unit plane $p^2 p^2$, of the lens G', in the point 8, then draw a line parallel to the axis of the lens from the point 8, to the point 9, in the unit plane $p' p'$, and then draw the line 10, from the point 9, to the target, we have one boundary of the pencil of rays whose axis is represented by the lines 5 and 6. Evidently the lines 11 and 12, may be likewise shown to be another boundary of said pencil. But this pencil enters the lens C', in the parallel form, like the pencil from the target D', illustrated in Fig. 4, and if we draw a line 13, from the second unit point V', of the lens C', parallel to the line 7, it must cut the focal plane $F^{21}$ $F^{21}$, in the focus E', of said pencil, which will mark the extremity of the first image corresponding to the upper extremity of the miniature target. Having fixed the point E', the points $U^{12}$, $V^{12}$ and the line 14, are readily found, and the other boundary of the convergent pencil, as shown in Fig. 5.

The condition for an equal apparent size of the service target, and of the miniature target, requires that the height of the image in Fig. 5, to be equal to the height $i$, of the image in Fig. 4. But from Fig. 5, considering the angles $\theta$, and the similarity of the triangles we have;

$$\frac{i}{F} = \frac{t}{f}$$

But from Fig. 4, $$\frac{i}{F} = \frac{T}{r}$$

Therefore $$t = \frac{Tf}{r}$$

It is evident that if a single lens G', is used as above indicated, that my focusing caps would be good only for one particular distance of the miniature target, or the slight variations which might be covered by the length of travel provided for in the tube that holds the said lens. But it is evident from well known optical principles that we can replace a single lens by a coaxial system that will have an equivalent focal length equal to the single lens. In other words, the lens G', in Fig. 5, can be replaced by a combination of two lenses properly spaced in accordance with the well known law expressed by the formula, $$f = \frac{f'f''}{K}$$

Where $f$, is the equivalent focal length of the combination, $f'$, is the focal length of the first lens and $f''$, is the focal length of the second lens, while K, is the distance the first focal plane of the second lens lies in front of the second focal plane of the first lens. It is evident, from this equation, that by varying the distance between the two lenses of this combination, we can vary the equivalent focal length of said combination.

In practice, on account of varying distances which are encountered, I find it most convenient to employ a combination consisting of one plus and one minus lens. It is immaterial in which order these lenses are placed, but in Fig. 6, the first $G^2$, is shown positive and the second $G^3$, negative. The cardinal planes of the first lens $G^2$, are $f'_1 f'_1$ $p'_1 p'_1 p'_2 p'_2 f'_2 f'_2$, its focal length is $f'$. The cardinal planes of the second lens, whose focal length is $-f''$ are; $f''_2 f''_2 p''_1 p''_1 p''_2 p''_2$ $f'''_1 f'''_1$. Since the first focal plane of the second lens is actually a distance K, in rear of the second focal plane of the first lens, we may say that the first focal plane of the second lens lies forward of the second focal plane of the first lens by a distance equal to $-K$. The assignment of a negative sign to the value of a focal length of a divergent lens agrees with the customary convention in optics and is here used for convenience in the formulas. The equivalent focal length of the combination is, therefore, $$f = f'\frac{(-f'')}{-K}$$

and the value of this focal length is positive. Therefore, this combination has convergent properties, and will give the same result as a single plus lens having a focal length $f$. Furthermore, if the lenses are moved apart, the quantity $-K$, increases and the equivalent focal length of the combination diminishes. In other words, as the first lens is moved outward the first focal plane of the combination moves inward. If the value of the focal length $-f'''$, is not greater than the value of the focal length $f'$, it is evident that we can move the lenses $G^2$ and $G^3$ toward one another, until the first focal plane $f'''_1 f'''_1$, of the lens $G^3$, coincides with the second focal plane $f'_2 f'_2$, of the lens $G^2$; for this position the quantity $-K$, vanishes and the equivalent focal length, as given by the above equation, is evidently infinite.

Having found a suitable combination of lenses, to take the place of a single plus lens in my focusing cap, it still remains to determine the distance of the first focal plane of the combination in front of the first lens; for this is the position in which the miniature target must be placed to give the desired result. This distance can be determined by applying the well known relation between conjugate foci, expressed by the formula $XY = (f')^2$ where X, is the distance between the first focal plane and the object, Y, is the distance between the second focal plane and the image, and $f'$, is the focal length of the lens. This will be made plainer from an inspection of Fig. 7, where $q$, represents a point on the axis of the lens $G^2$, at a distance X, in front of the first focal plane $f'_1 f'_1$. The focal length $f'$, of this lens is indicated as in Fig. 6. Here we may find the image of the point $q$, at $q'$, on the axis of the lens, by laying off a distance Y, in rear of the second focal plane $f'_2 f'_2$ such that $$Y = \frac{(f')^2}{X}$$

The unit planes of this lens being found at $p'_1 p'_1$ and $p'_2 p'_2$; we may now plot, by the graphic method, the path of any ray from $q$, to the point $q'$, as shown in broken lines in said figure, by following the principles above set forth.

Taking the diagram shown in Fig. 7, we will now add the cardinal planes of the negative lens $G^3$, having a focal length $-f'''$, of a magnitude not greater than $f'$, placing said lens so that its first focal plane passes through the point $q'$, and we thus form the combination shown in Fig. 9, where the unit planes $p''_1 p''_1$ and $p''_2 p''_2$, of the negative lens $G^3$, are illustrated, as well as the focal plane $f'''_1 f'''_1$. The second focal plane $f'''_2 f'''_2$ of this lens $G^3$, is omitted for the sake of clearness, but it is shown in Fig. 6.

From an inspection of Fig. 9, it will be seen that the ray which originated at the point $q$, and would have converged to the point $q'$, now emerges from the lens $G^3$, in a direction parallel to the common axis of the lenses as indicated by the line 16. The reason why this ray is parallel to the common axis of the lenses after emergence is, because before entrance to the negative lens it had a line of direction toward the first principal focus, which was the point $q'$, where the first focal plane intersects the axis of the lens. Having obtained the direction of the line 16, or the path of the axis of the ray starting from the point $q$, the final path of said ray through the objective $C'$, of the telescope may be plotted by the graphic method, above outlined.

Referring again to Fig. 9, it has been shown that a ray starting from $q$, after emergence from the combination, is parallel to the common axis, and it is evident that the point $q$, is the first principal focus of the combination. Therefore, if we make the distance $Y = -K$, the combination will be the same as that disclosed in Fig. 6. The distance of the first focal plane of the combination measured from the first unit plane of the first lens is:—

$$d = f' + X$$

or since $$X = \frac{(f')^2}{-K}$$

$$d = f' + \frac{(f')^2}{-K}$$

Referring back to Fig. 6, if we provide two lenses of equal focal length of the class there shown, and with the faces arranged in the way indicated, the quantity $-K$, will also be the distance between the contiguous faces. If we then neglect the small distance between the first face and first unit point of the first lens, we can say the first focal point of the combination lies at a distance forward of the first lens amounting to its focal length plus its focal length squared and divided by the space between the lenses. That is to say, if, for instance, we put $f' = -f''' = 7$ inches and $-K = \frac{1}{5}$ inch, then $d = 252$ inches. This arrangement in a focusing cap would suit a miniature target 21 feet forward of the first lens. Then with this focusing cap, and given distance of the miniature target, we could determine the spacing of the lens. For instance, to suit a target two feet from the first lens we would have $$24 = 7 + \frac{49}{-K}$$

whence $-K = 2.888$ inches. This will probably be the extreme case for the motion of the lenses apart, for no miniature targets are likely to be located closer to the objective than 24 inches. Therefore, if the focusing cap be designed to permit an extension of 2.888 inches with the lenses as above, it may be used for any distance of miniature targets, from two feet up to infinity. As a convenience to the battery officer, the focusing cap could be marked with a scale in one foot divisions corresponding to distances of the miniature target from two feet up to 20 feet, which will probably include all conditions found in the vessels of our navy. This scale may be calculated from the formula;

$$d = f' + \frac{(f')^2}{-K}$$

$$d = 7 + \frac{49}{-K}$$

But in view of the possible small errors in the curvature of the lenses, it would be preferable to mark this scale experimentally.

It is evident that if we substitute the equivalent focal length for $f$, in the equation $$t = \frac{Tf}{r}$$

above, we can obtain the proper height of the miniature target to represent the height of the service target at the mean target practice range. In other words, if we substitute the equivalent focal length $f$, in said equation, we will obtain $$t = \frac{T(-f'')f'}{-Kr}$$

But when the focal length of the two lenses are equal, we have $$\frac{(-f'')f'}{-K} = \frac{(f')^2}{-K}$$

and since $$d - f = \frac{(f')^2}{-K}$$

$$t = \frac{T(d - f')}{r}$$

Now if the focal length of each lens is seven inches, the battery officer can easily calculate the size of the miniature target. In such calculation he should use the following formula, where all terms are in feet:—

$$t = \frac{T(d - \frac{7}{12})}{r}$$

In this formula, $t$ = the height of the miniature target,
$T$ = the height of the service target,
$r$ = the mean target practice range,
$d$ = the reading of the scale on the tube in the focusing cap, or else the measured distance of the miniature target from the first lens.

For convenience in explaining the focusing cap, I have used a plano-convex and a plano-concave lens, placing them with their curved sides opposing. But as regards spherical aberration this would be a poor disposition of the radii of curvature, and there would probably be a sensible distortion of the image. Although it is impossible to get rid of all the spherical aberration in an instrument where a focal length is variable, we may improve matters by using the same type of plus lens, placing its curved face to the front, and instead of using a plano-concave lens, we may use an equi-concave, as shown in Fig. 8, where the cardinal planes, focal lengths and distance $-K$, are all indicated as in Fig. 6.

Another advantage of employing the disposition and kind of lenses shown in Fig. 8, is apparent on an inspection of the lens 12, there shown. Here the formulas for distance and size of the miniature target become exact; for the first face and first unit plane of the first lens 12, are co-incident. It is apparent, however, that we can no longer take $-K$, as a distance between the opposing lens faces, for this would introduce two small errors. $-K$, must be given its proper value, which is the distance between the first focal plane of the second lens and the second focal plane of the first. Having arranged the lenses as shown in Fig. 8, it is then only necessary to mount the same in some convenient manner, as for example as shown in Fig. 2, and to provide for their ready attachment to the telescope.

Referring now to Figs. 1 and 2; 1, represents the body of the telescope; 2, the end carrying the eye piece; and 3, the end carrying the object glass. Over the end 3, of the telescope fits the cap 4, which is screw threaded on to the tube 5, which in turn slides on the tube 6. 7, is a clamping band operated by the thumb screw 8, for holding the tube 5, in its adjusted position on the tube 6; and 9, represents a suitable scale preferably graduated for feet, and indicating the distance of the miniature target from the object glass end 3, of the telescope. 10, indicates a thumb screw for firmly clamping the cap 4, on the end of the telescope, and for this purpose the said cap is provided with split lugs 11, through which said thumb screw 10, passes. The plus lens employed in this combination is designated 12, and the equi-concave lens is designated by 13.

In operation the telescope is focused for battle and kept at all times so focused, and therefore ready for use. Whenever it is desired to have sub-target practice, the focusing cap is secured in place as above described, on the objective end of the telescope, and the sights are directed to the miniature target carried by the ship, and which at once appears clear and distinct; and, also, of the same size as a distant real target ordinarily appears when aimed at.

It is evident from the foregoing, that my invention is by no means limited to sighting telescopes, but is applicable to optical instruments in general wherever it is desired that the instrument shall produce a clear image of objects that are far and near, without adjusting the focus of the lenses. In fact my invention will be found useful to oculists. Therefore I do not wish to be understood as limiting my invention to sighting telescopes, nor to the exact structure and arrangement of parts herein disclosed, since it is evident that the same may be widely varied by those skilled in the art without departing from the spirit of my invention.

What I claim is:—

1. In telescopes, the combination of the lenses thereof adapted to be focused for a distant target; and means causing said lenses when so focused and directed on a near miniature target, located at a plurality of distances from said telescope, to produce distinct images of said miniature target, substantially as described.

2. In telescopes, the combination of the lenses thereof adapted to be focused for a distant target; and means comprising a plus lens causing said lenses when so focused and directed on a near miniature target, located at a plurality of distances from said telescope, to produce distinct images of said miniature target, substantially as described.

3. The combination of a telescope, with means comprising a plus lens adapted to cause said telescope when focused for a distant target of a given size, and when directed on a near miniature target of a proportionate size and at a plurality of distances from said telescope, to produce distinct images of said miniature target and of the same size as the image of the distant target, substantially as described.

4. The combination of an optical instrument provided with lenses adapted to produce a distinct image of a distant object, of an attachment for said instrument adapted to cause the same, when focused for a distant target, to produce clear images of a near miniature target when directed on the same, and when located at a plurality of distances from said telescope, substantially as described.

5. In sighting telescopes, the combination of the lenses thereof, with an attachment comprising a plus lens, adapted to cause said telescope when focused for a distant target of a given size and directed on a near miniature target of a proportionate size located at a plurality of distances from said telescope, to produce distinct images of said miniature target and of the same size as the image of said distant target, substantially as described.

6. In sighting telescopes, the combination of the lenses thereof, with a focusing cap attachment adapted to fit the object glass end of said telescope, comprising a plus lens, and adapted to cause said telescope, when focused for a distant target and directed on a near miniature target located at a plurality of distances from said telescope, to produce distinct images of said near target, substantially as described.

7. In telescopes, the combination of the lenses thereof adapted to be focused for a distant target; and means comprising plus and negative lenses causing said telescope lenses, when so focused, to produce distinct images of a near miniature target when directed on the same, and when said target is located at a plurality of distances from said telescope, substantially as described.

8. The combination of an optical instrument provided with lenses adapted to be focused for a distant target, of an attachment for said instrument, comprising plus and negative lenses, adapted to cause the instrument when focused for said distant target and directed on a near miniature target, to produce clear images of the latter when located at a plurality of distances from said telescope, substantially as described.

9. In sighting telescopes, the combination of the lenses thereof, with an attachment comprising a plus lens and a negative lens suitably spaced apart, and adapted to cause said telescope, when focused for a distant target and directed upon a near miniature target located at a plurality of distances from said telescope, to produce distinct images of said miniature target, substantially as described.

10. In sighting telescopes, the combination of the lenses thereof, with a focusing cap attachment adapted to fit the object glass end of said telescope, comprising a plus lens, and a negative lens suitably spaced apart, and adapted to cause said telescope, when focused on a distant target of given dimensions and directed to a near miniature target of proportionate dimensions and at a plurality of distances from said telescope, to produce distinct images of said miniature target, and of the same size as the image of the distant target, substantially as described.

11. In a sighting telescope adapted to be permanently focused for battle, or for target practice range, the combination with a focusing cap adapted to be attached to the object glass end of said telescope and provided with a plano-convex lens and an equi-concave lens, separated at such a distance that they will cause said telescope, while so focused, to produce distinct images of a near miniature target when directed on the same, and when the latter is located at a plurality of distances from the telescope, substantially as described.

12. The combination of a sighting telescope adapted to produce an image of a distant target and to be left focused for battle, or for target practice range, and a focusing cap adapted to be attached to the object glass end of said telescope, provided with a plano-convex lens, and an equi-concave lens separated at such a distance that they will cause said telescope, while focused as above stated, and directed on a near miniature target of a size proportioned to said distant target, to produce a distinct image of said miniature target and of substantially the same dimensions as the image of the distant target, substantially as described.

13. The combination of a sighting telescope adapted to produce an image of a distant target and to be left focused for battle, or for target practice range, and a focusing cap adapted to be attached to the object glass end of said telescope, provided with a combination of lenses consisting of a positive and a negative lens separated from each other, and having means adapted to so adjust the same that they will cause said telescope, while focused as above stated, and directed on a near miniature target of a size proportioned to said distant target, to produce a distinct image of said miniature target and of substantially the same dimensions as the image of the distant target, substantially as described.

14. A focusing cap for optical instruments provided with a positive and a negative lens, adapted to be adjusted toward and from each other, and having means for attachment to an optical instrument, substantially as described.

15. A focusing cap for sighting telescopes comprising a tube having a negative lens secured thereto, a second tube adjustable with relation to said first tube, and having a positive lens secured thereto, and means for attachment to the object end of a telescope, substantially as described.

16. A focusing cap for telescopes comprising a tube having an equi-concave lens secured therein; a second tube sliding in the first tube and having a positive lens secured therein; a clamp to secure said tubes and lenses in their adjusted positions, and a second clamp for securing the cap to a telescope, substantially as described.

In testimony whereof, I affix my signature, in presence of two witnesses.

HENRY C. MUSTIN.

Witnesses:
  CORRINE M. MUSTIN,
  J. D. COPELAND.